A. CALLESON.
MACHINE FOR OPERATING ON TUBULAR ARTICLES.
APPLICATION FILED JAN 23, 1917.
1,289,389.
Patented Dec. 31, 1918.
10 SHEETS—SHEET 4.
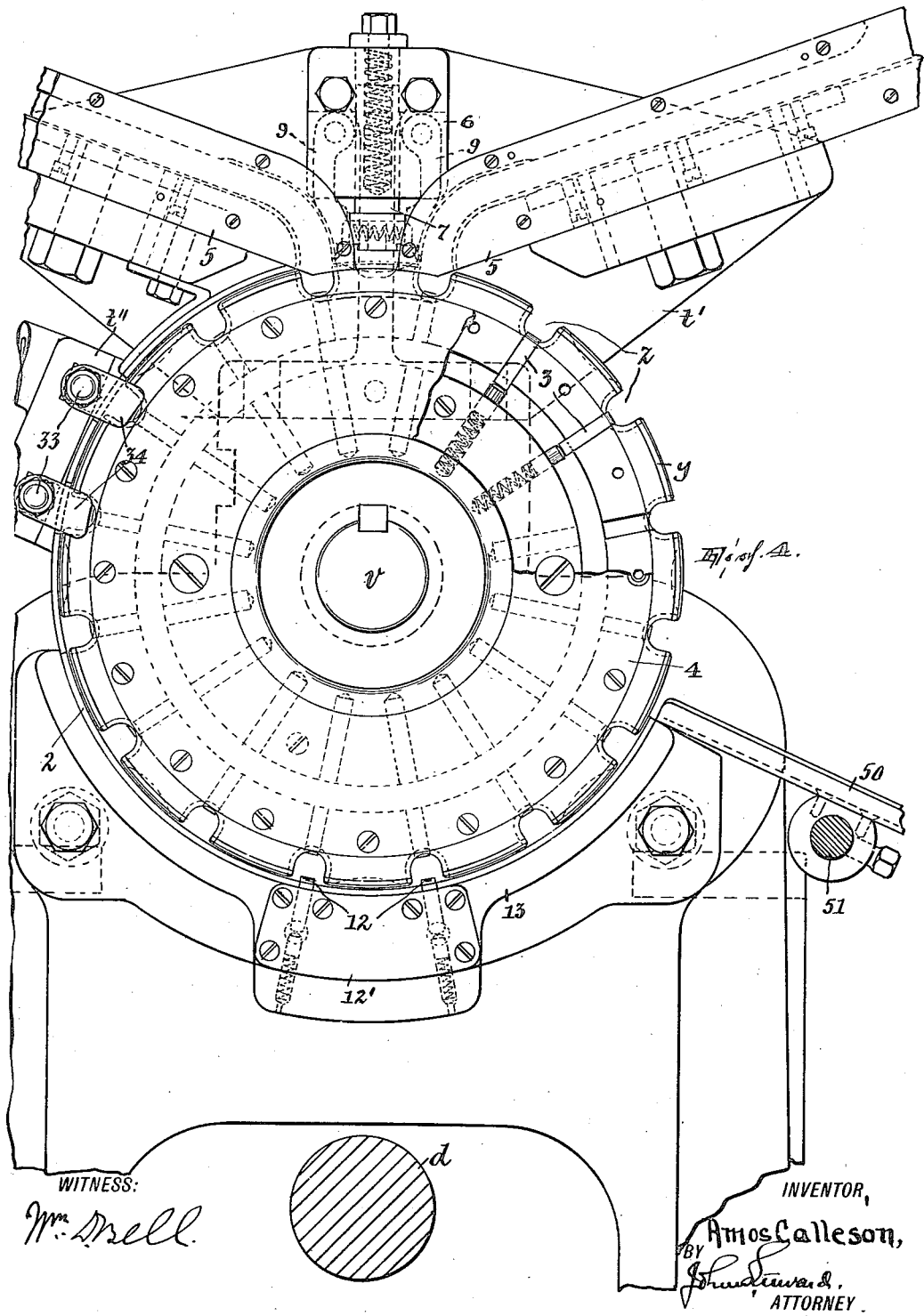

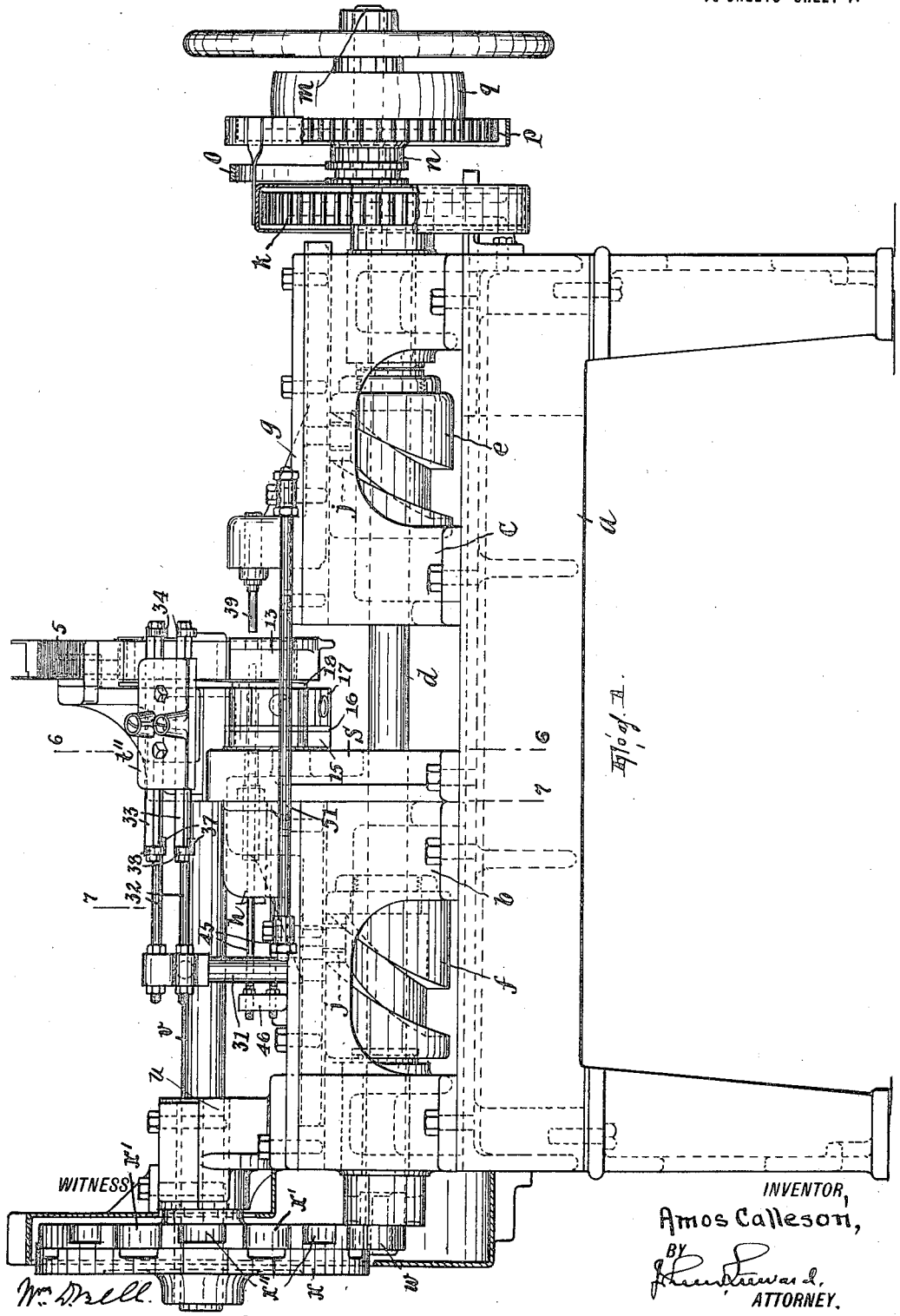

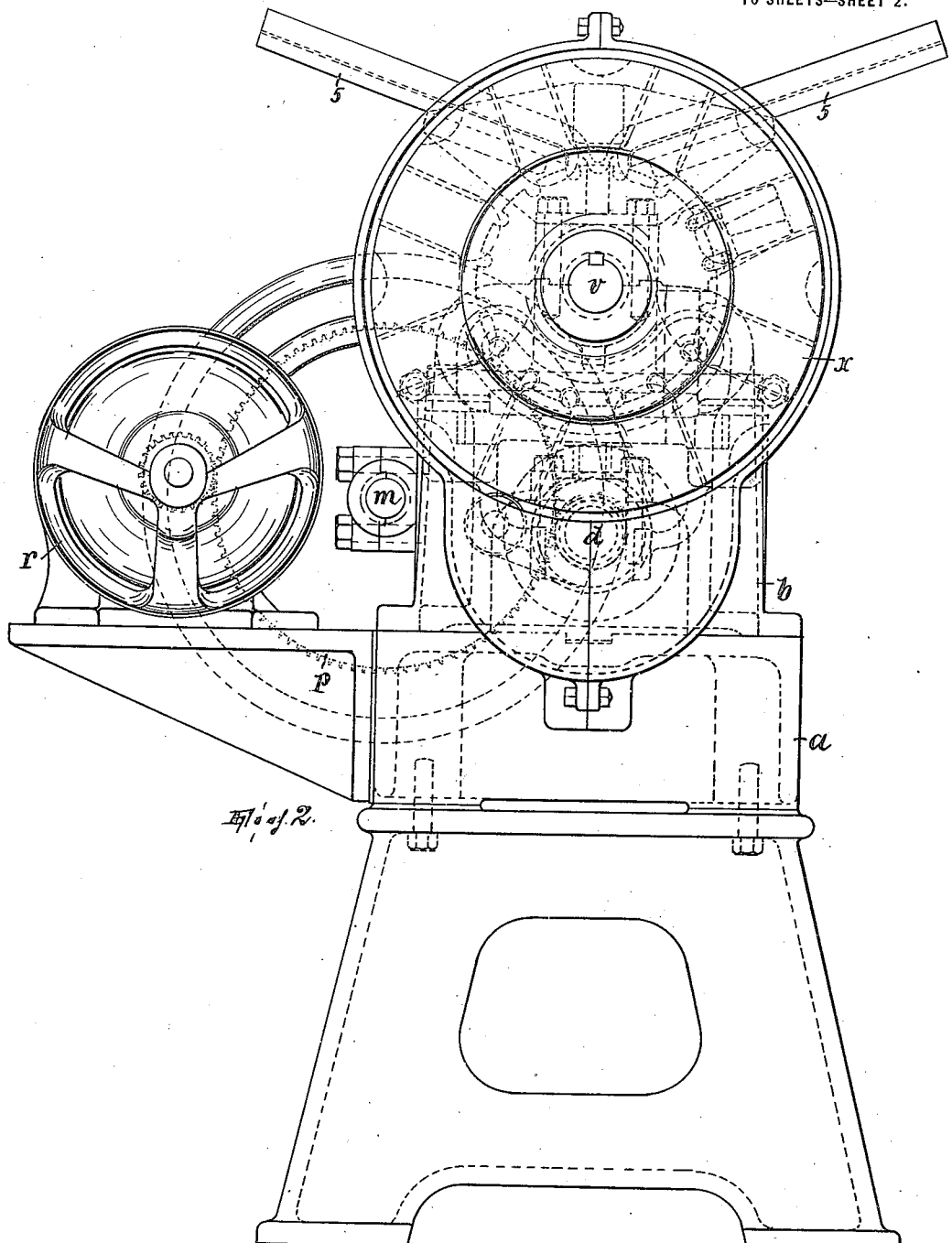

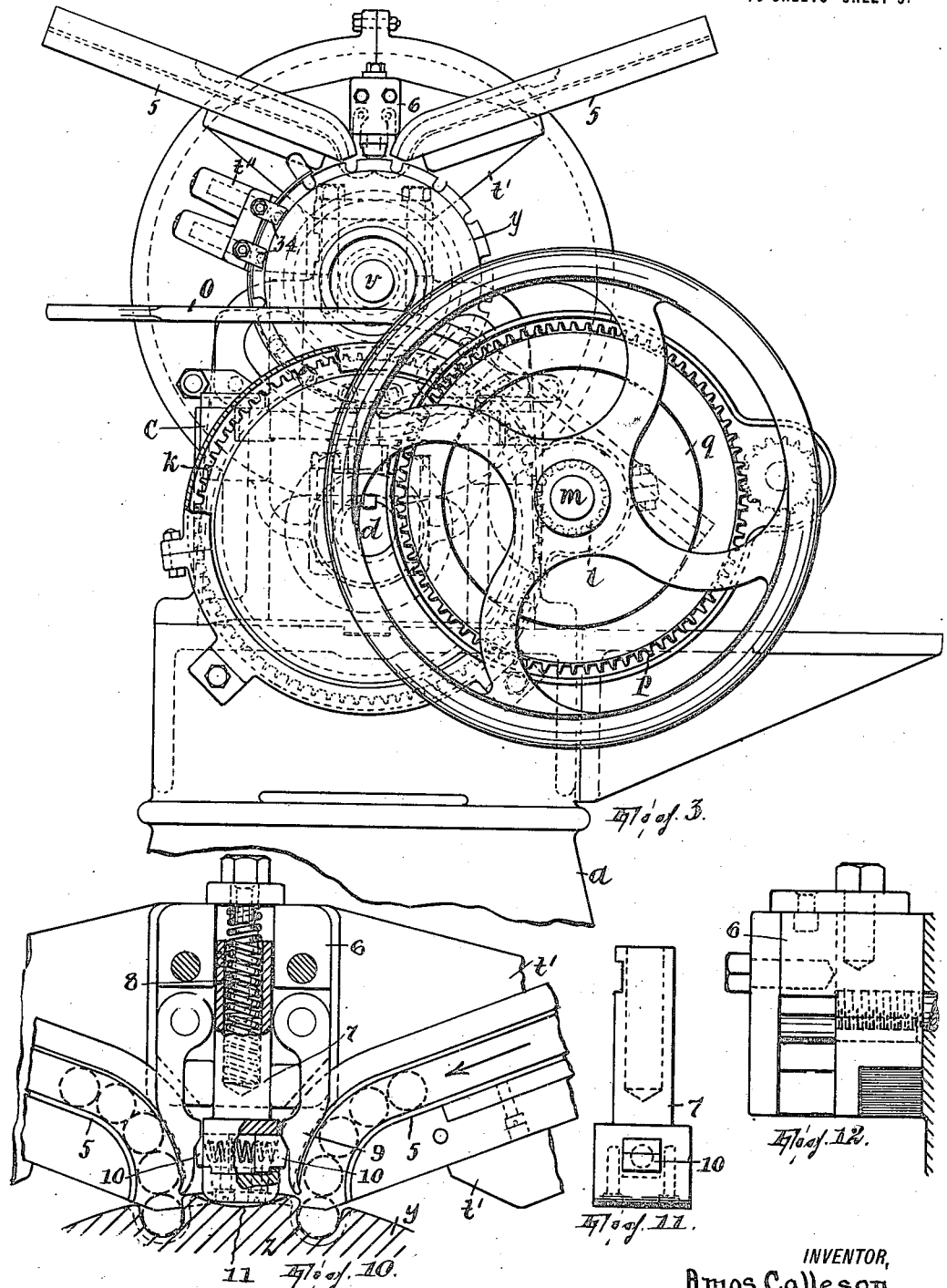

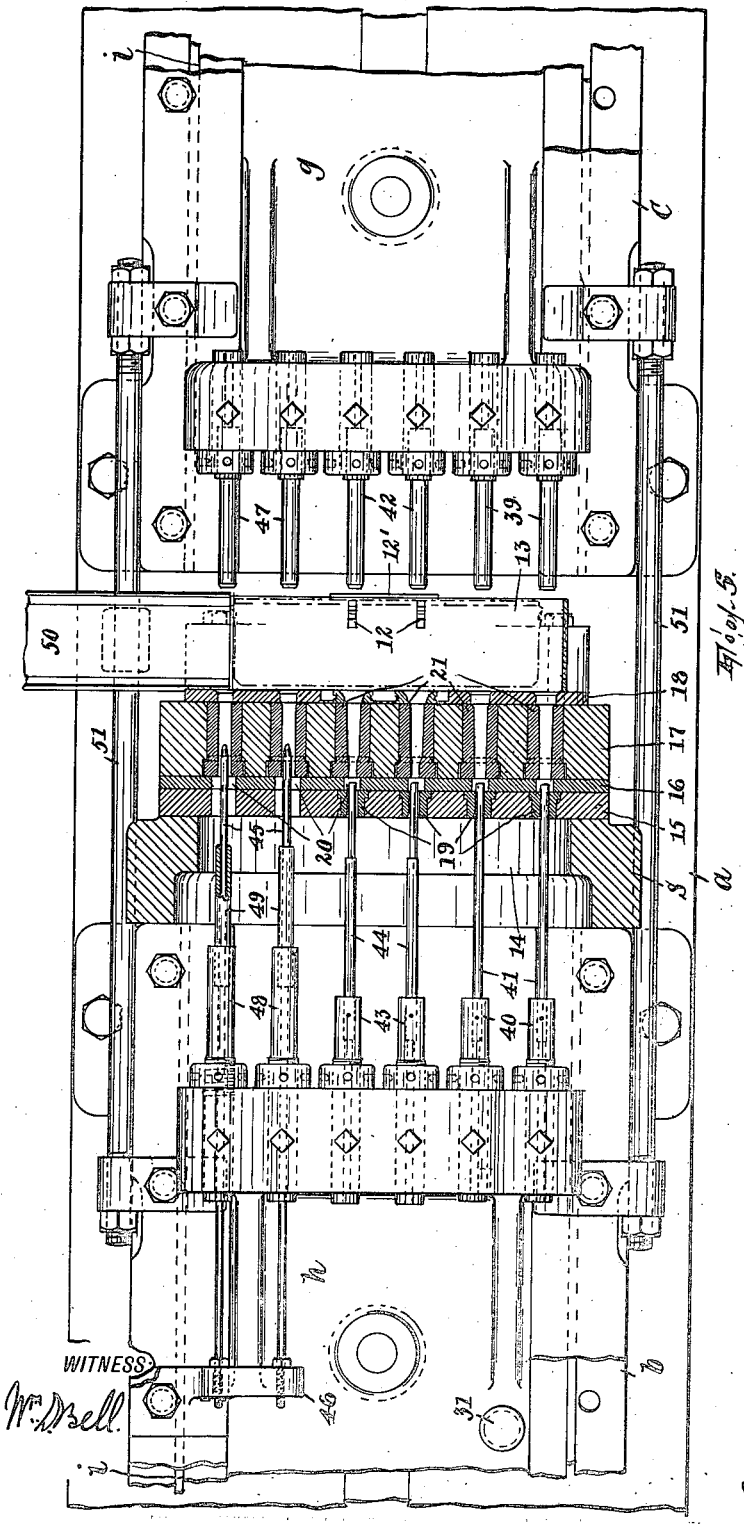

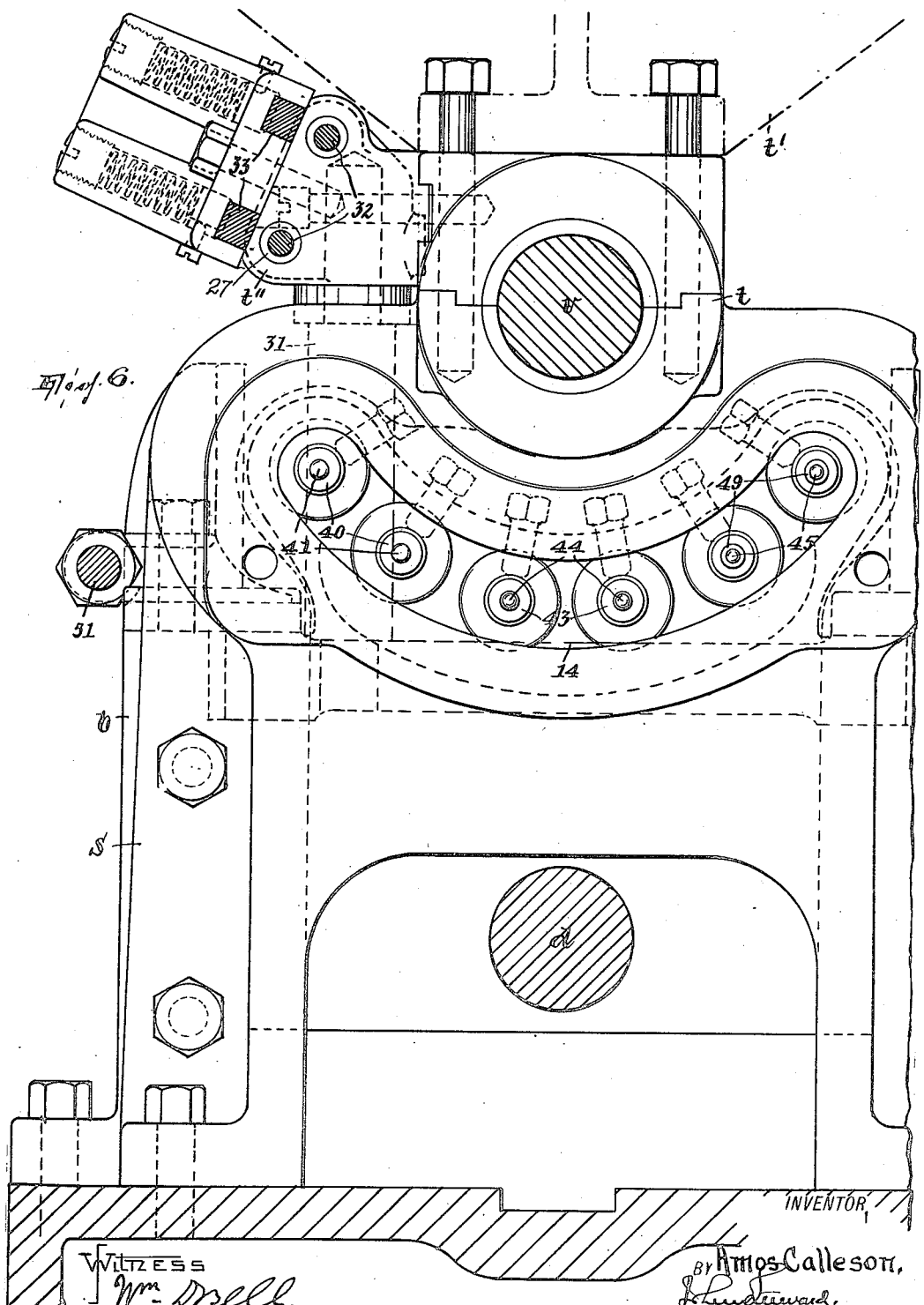

A. CALLESON.
MACHINE FOR OPERATING ON TUBULAR ARTICLES.
APPLICATION FILED JAN. 23, 1917.
1,289,389.
Patented Dec. 31, 1918.
10 SHEETS—SHEET 7.
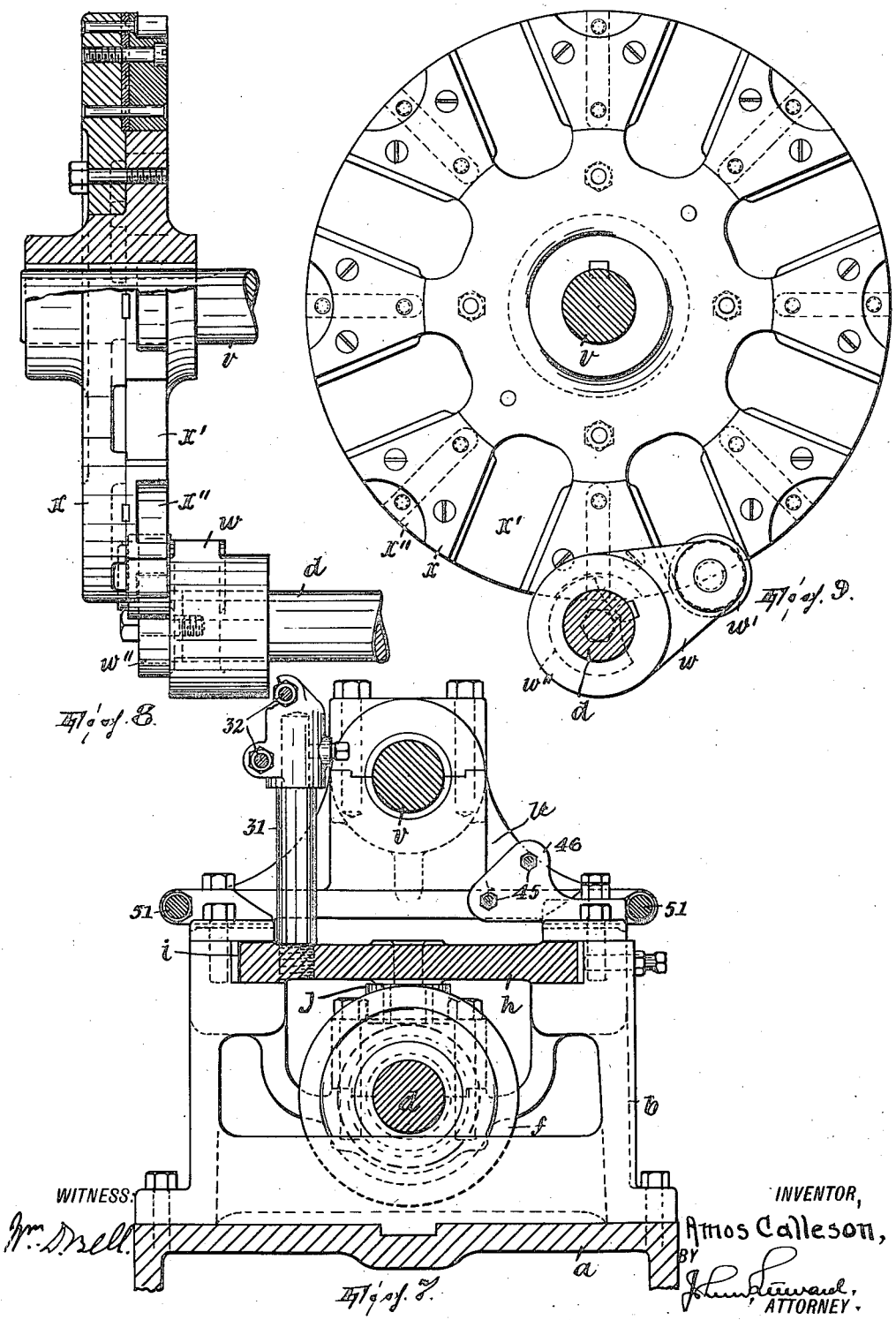
INVENTOR,
Amos Calleson,
BY
ATTORNEY.

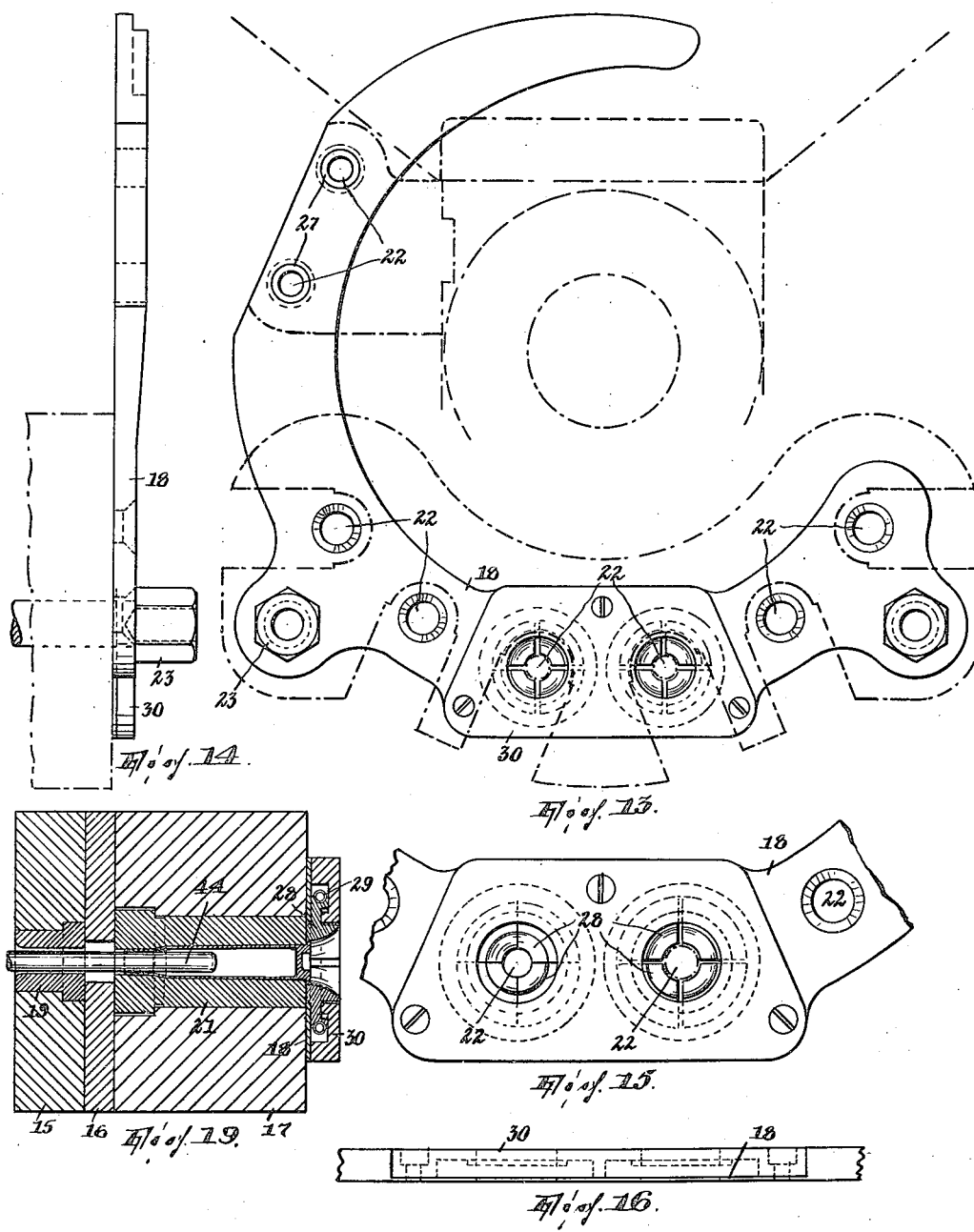

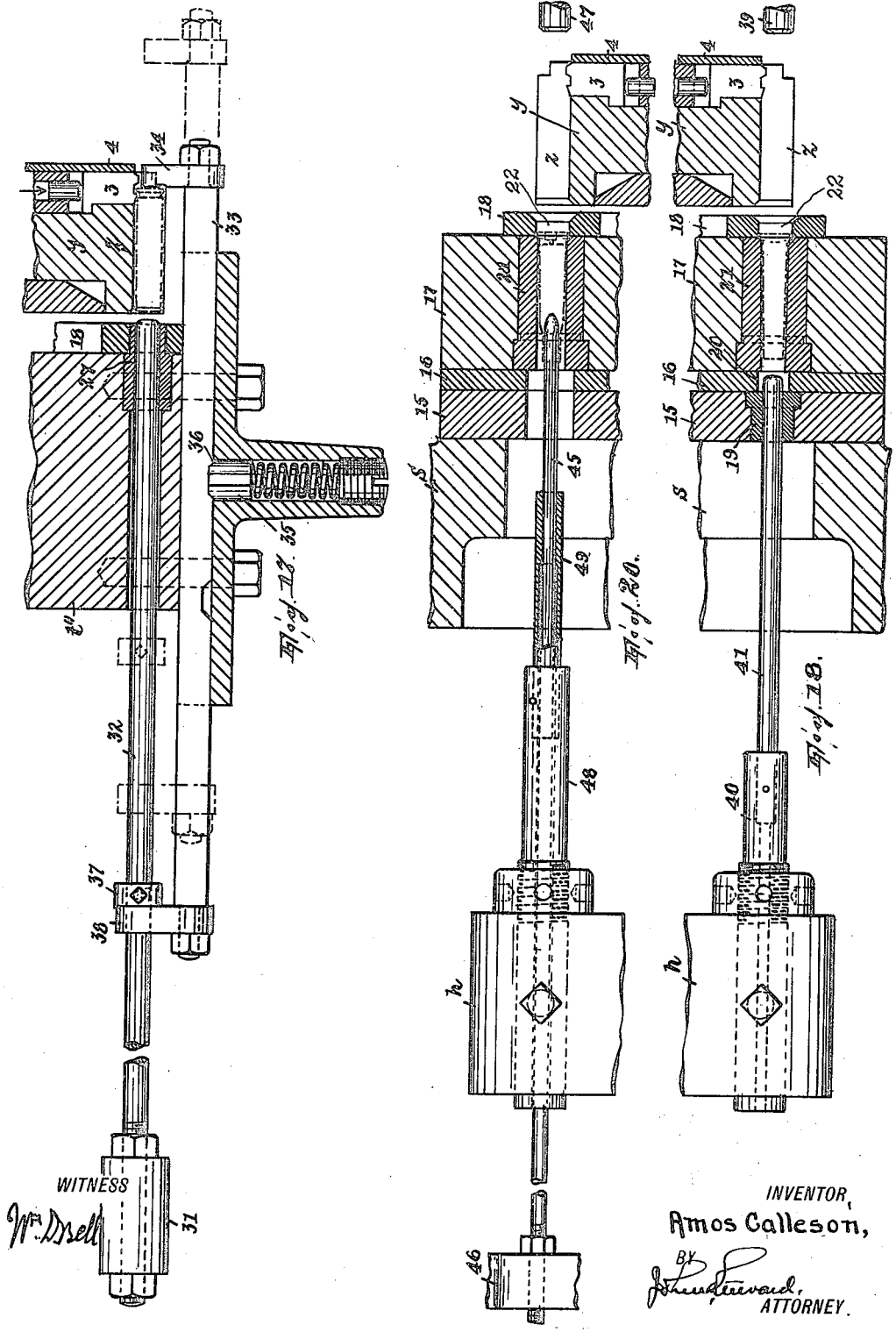

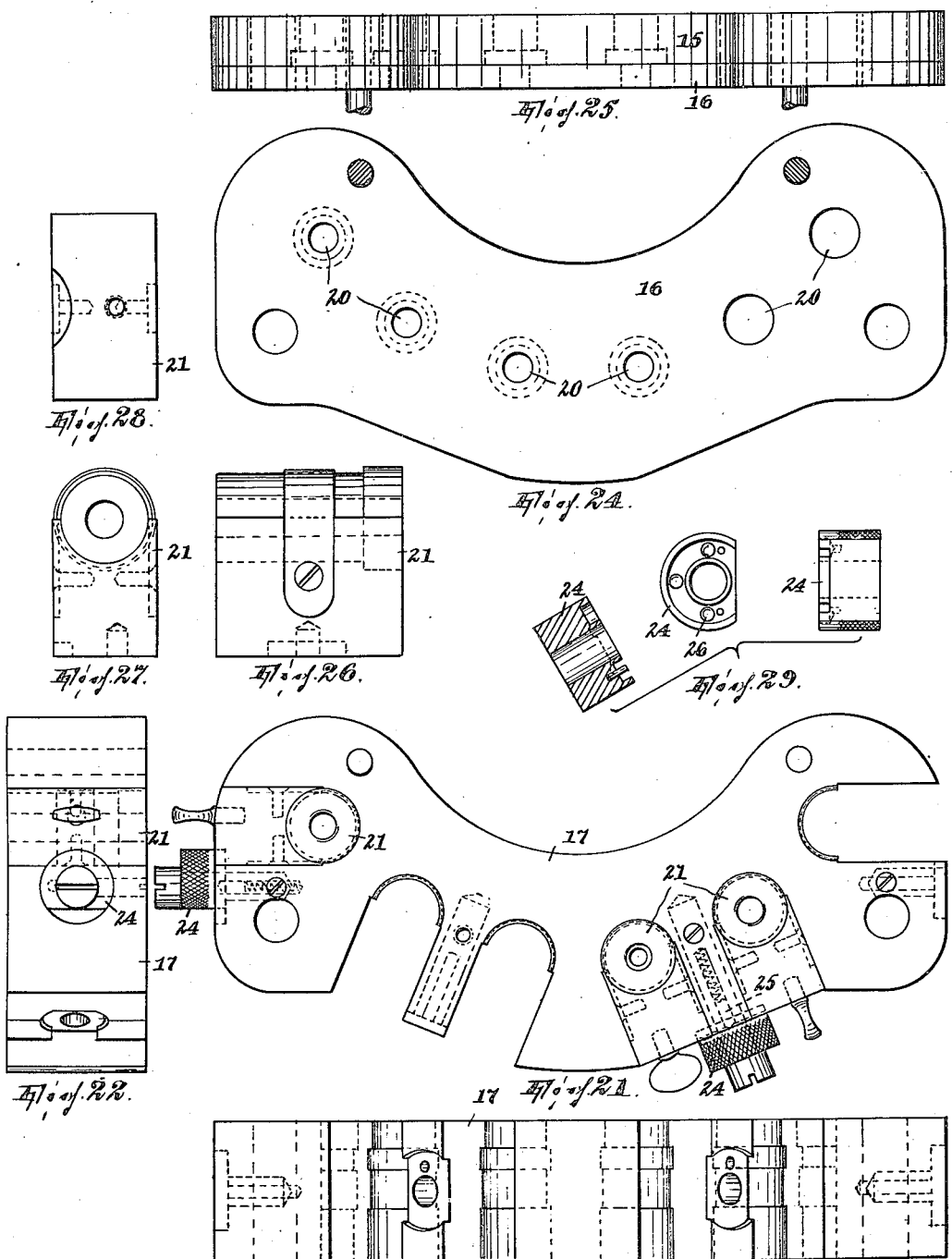

UNITED STATES PATENT OFFICE.

AMOS CALLESON, OF BROOKLYN, NEW YORK, ASSIGNOR TO ADRIANCE MACHINE WORKS, INC., OF BROOKLYN, NEW YORK, A CORPORATION OF NEW YORK.

MACHINE FOR OPERATING ON TUBULAR ARTICLES.

1,289,389.

Specification of Letters Patent. Patented Dec. 31, 1918.

Application filed January 23, 1917. Serial No. 143,946.

*To all whom it may concern:*

Be it known that I, AMOS CALLESON, a citizen of the United States, residing at Brooklyn, in the county of Kings and State of New York, have invented certain new and useful Improvements in Machines for Operating on Tubular Articles, of which the following is a specification.

This invention relates to machines for operating on tubular metallic articles and the like by means acting on the articles thrustwise longitudinally thereof, and it has for its particular object to provide a machine through which the articles may be passed in succession at a high rate of speed and therein shaped or otherwise operated upon with assurance that the output will be uniform in character and with as little necessity as possible for manual attendance beyond that required to supply the machine with the articles to be operated upon. In the machine herein illustrated by way of example shells to form cartridge shells are operated upon, and the following steps are performed upon each shell, to wit: (1) Each shell is subjected to selecting mechanism which either passes it on to the next succeeding step, if it is properly faced and is of normal shape, or causes its ejection if it is improperly faced or of abnormal shape; (2) next, each shell, initially cylindrical, is drawn to a tapering form; (3) next, the mouth portion is shaped cylindrical for the reception of the bullet or ball; and (4) finally the mouth proper is "ball-sized," or made of the diameter to which the ball or bullet will exactly fit.

The articles are fed to a turret or shell carrier rotating on a horizontal axis and formed with peripheral pockets calculated to support each article with its axis parallel with that of the turret. The turret rotates step by step, and on each pause the stated instrumentalities for operating on the articles perform simultaneous thrust movements that affect eight articles at once, that is, two are subjected to the selecting step, two to the tapering step, two to the step whereby their mouth portions are made cylindrical and two to the ball-sizing step.

The articles are fed to the turret by two chutes in the present adaptation and there is a novel means for insuring a two-by-two delivery of the shells from the chutes, one from each, on each pause of the turret.

In the accompanying drawings,

Figure 1 is a side elevation of the machine;

Figs. 2 and 3 are left and right hand end elevations, respectively;

Fig. 4 is a vertical sectional view taken just to the right of the turret and looking toward the left in Fig. 1;

Fig. 5 is a plan, with that part of the machine which includes the instrumentalities for performing three of the aforesaid steps of the operation on each shell shown in section in the imaginary surface of a cylinder in which their axes lie, viewed from the axis of such cylinder;

Fig. 6 is a vertical sectional view approximately in the plane 6—6, Fig. 1, with certain parts shown in elevation;

Fig. 7 is a vertical sectional view substantially on the line 7—7, Fig. 1;

Figs. 8 and 9 are, respectively, a side view, partly in section and a right hand elevation of the means for imparting the step by step motion to the turret;

Fig. 10 shows partly in right side elevation and partly in section fragments of the turret and chutes and means for effecting the two-by-two delivery of the shells from the chutes to the turret;

Fig. 11 is a side elevation of a plunger, and Fig. 12 a side elevation of the bracket, shown in Fig. 10;

Figs. 13 and 14 are a right side elevation and an edge view of a certain plate 18 operative in guiding the shells into the dies;

Figs. 15 and 16 are an enlarged elevation and plan of a fragment of said plate;

Fig. 17 shows in section a fragment of the turret and the selecting means;

Figs. 18 and 19 show in section, respectively, the means for first converting a shell to tapering form and for then shaping its mouth portion cylindrical and Fig. 20 shows in section the means for ball-sizing the mouth of the shell, Figs. 18 and 20 also showing fragments of the turret and certain spindles;

Fig. 21 is a right side elevation, Fig. 22 an edge view and Fig. 23 a plan of the plate 17;

Figs. 24 and 25 are a right side elevation and a plan of certain plates 15 and 16;

Figs. 26, 27 and 28 are a side elevation, an end elevation and an underneath plan of one of the dies; and, Fig. 29 shows in section, rear elevation and side elevation a detail of the means for securing each die in place.

On a base *a* are arranged two tables *b c* alined with each other and affording bearings for a horizontal shaft *d* which carries, housed in the table, barrel cams *e* and *f* adapted to reciprocate two slides *g* and *h* arranged in guideways *i* (Fig. 5) on the tables, the slides having depending rollers *j* engaged in the grooves of the cams. Shaft *d* is driven through a gear *k* (Fig. 3) from a pinion *l* on a counter-shaft *m*, the pinion being disconnectively connected by a clutch *n*, having a controlling lever *o*, with a gear *p* and pulley *q* rotating as one on the counter-shaft; the power may be supplied by a belt on pulley *q* or by a motor *r* geared up with the gear *p*.

A standard *s* bolted upon frame *a* abuts the inner end of the table *b*, and in a bearing *t* (Fig. 6) thereon and a bearing *u* on table *b* is journaled a horizontal shaft *v* adapted to be rotated by a Geneva stop mechanism (Figs. 1, 8 and 9) from the shaft *d*, the elements of such mechanism being a crank *w* on shaft *d* and a disk *x*, the disk having radial slots *x'* to receive the roller *w'* on the crank for imparting rotary impulses to the disk and also having recesses *x''* alternating with the slots to receive a mutilated disk *w''*, on the crank, which stops rotation of the disk each time roller *w'* leaves a slot *x'*. Shaft *v* is rotated counter-clockwise.

A circular turret or shell carrier *y* is keyed to the inner end of shaft *v* and has twice as many equidistantly spaced elongated pockets *z* arranged in its periphery parallel with the shaft as there are stopping points in disk *x*. As will be explained, the shells are fed to these pockets sidewise so that when deposited therein each stands with its head or closed end projecting to the right in Fig. 1 (see Fig. 17, for example), and in the rotation of the disk they are confined in the pockets by an arc-shaped guard 2 (Fig. 4) which extends around the turret from a point radially above the same to a point about 270° away. The head of each shell has the usual "cannelure" or circumferential groove, and for camming the shells longitudinally into and thereupon holding them in trued up relation so that their ends will be precisely all in the same plane there are slidable radially in suitable slots in the disk the spring-pressed dogs 3 (Figs. 4, 18 and 20) each of which engages in a cannelure of a shell and presses the latter against the guard 2, the engaging part or projection thereof having oppositely inclined faces to effect such camming (Fig. 17); the dogs are retained in their slots by a circular plate *4* secured to the disk.

A bracket *t'* bolted onto the top of standard *s* (Figs. 4 and 6) supports two oppositely inclined chutes or runways 5 for the shells, arranged to debouch at the periphery of the disk above the same and a distance apart equal to the spacing between its pockets. To obtain two-by-two delivery of the shells from the chutes the following instrumentalities are provided: A bracket 6 is bolted to the bracket *t'* between the chutes and affords a guide for a vertically movable plunger 7 held pressed down against the periphery of the disk by a spring 8. On each side of this plunger is pivoted in the bracket a shell detent 9 movable on its pivot toward and from the bottom of the adjoining chute, which at its lower end is curved downwardly. The plunger has a pair of spring-pressed blocks 10 yieldable toward each other horizontally which, when the plunger rises, press the detents apart, so that they act to clamp the lowest shells against the bottoms of the chutes, and when the plunger descends free the detents. The plunger is held elevated while the disk is rotating and descends when the disk stops; its descent is permitted by the disk whenever a recess 11 in the latter's periphery is presented to the plunger, *i. e.*, one for each two pockets therein. When the disk comes to a stop with two empty pockets opposite the chutes, the plunger being then depressed and the detents free, both lines of shells in the chutes fall till the lowest shell in each occupies a pocket. On the disk now turning to present the next two pockets, the incidental rise of the plunger will cause the detents to clamp the lowest shells against the pressure of those behind until the disk comes again to a stop with both such pockets opposite the chutes. The chutes are formed to support the shells and deliver them to the pockets side by side, with their axes parallel with that of the turret.

At a certain point in the rotation of the turret (to wit, diametrically opposite the point of feeding-in the shells—Fig. 4) two dogs 12 are slidable radially in a guide block 12' fitted to an arc-shaped bracket 13 (see also Fig. 5) which is bolted to the standard *s* (being removed in Fig. 1), said dogs being spring-pressed radially inwardly and adapted to coact with each two dogs 3, as will be explained; they are substantially like the dogs 3, and engage in the cannelures of the shells.

Against the right-hand face (Fig. 1) of the standard *s*, which is provided with a slot 14 formed arc-shaped with the shaft *v* as an axis (Fig. 6), are secured in the order named the following plates, to wit, 15, 16, 17 and 18. Plate 15 is equipped with a line of four thimbles 19 coincident with the slot 14, plate 16 with six holes 20 also coincident with said slot, plate 17 with six dies 21 whose apertures are coincident with said slot, and plate 18, which is three-quarters crescent shape, with eight holes 22, six of which are coincident with said slot (see Fig.

13); the holes 20 and the said six holes 22 and the holes of the dies and thimbles are all alined with each other. The several plates are secured to the standard by cap-screws 23 (Figs. 13 and 14). Plate 16 affords a backing to the dies 21 (Figs. 26–28) which are removably held in slots in plate 17 (Figs. 21–23) by the turn-buttons 24 (Fig. 29) each of which is turnable quarter-revolutions (under the control of spring-pins 25 engageable in depressions 26 in the turn-buttons) so as either to overlap and hold in place a die or leave it unobstructed for removal, by having a segment of such turn-button cut away. Plate 18 has hardened thimbles 27 in its two upper left hand holes (Fig. 13), such thimbles being set in and backed by an extension $t''$ (Figs. 6 and 17) of bracket $t'$, said extension being in the same plane as the plate 17. To guide the shells into the dies, its next two holes and the two right-hand holes thereof are chamfered as shown in Fig. 13; the remaining two holes are convexly chamfered and are further expansible (for a reason to be explained), being formed by several sectors 28 which are normally held contracted to the position shown in Fig. 15 by a circumferential spring 29 and are confined in a housing 30 attached to plate 18.

The slides $g$ and $h$ carry the instrumentalities whereby, upon each pause in the rotation of the turret, eight shells are acted upon thrustwise in the manner already briefly outlined.

Referring, first, to the means for effecting the selecting step: A pillar 31 upstands from the slide $h$ and carries a pair of spindles 32 parallel with shaft $v$ and telescoping the thimbles 27. Each of these spindles is adapted on thrust movement to the right in Fig. 17 to idly telescope a shell properly deposited, with its mouth toward the left, in the opposed pocket of the shell carrier or turret if not too badly mutilated or mal-formed, but to push a shell longitudinally out of such pocket, so ejecting it from the machine, if the shell is unduly mutilated or mal-formed, overcoming for this purpose the resistance of the dog 3, which is wiped back by the shell into its slot in the turret. In the preferred construction the spindle is adapted to correct or reform mutilations or malformations of minor character with the assistance of an abutment means offering greater resistance to the thrust of the spindle than the dog 3 and consisting of a rod 33 slidable parallel with the spindle in the plate 17 and provided with an abutment 34 disposed so as to oppose the right hand end of the shell being operated upon. A spring-pressed plug 35, housed in bracket extension $t''$ engages in a notch 36 in the rod to oppose resistance to right hand movement of the rod sufficient to enable the spindle to correct the shape of the shell being operated upon but calculated to yield before the shell, if badly mutilated or mal-formed or improperly faced, would crumple up; and whenever the rod is moved to the right to the dotted line position its return is effected, when the spindle performs the next left-hand movement, by a collar 37 on the spindle engaging a stop 38 on the rod. Shells corrected in form by and adhering to the spindles are stripped therefrom when the latter retract by the thimbles 27, should the dogs 3 alone be ineffectual to accomplish this.

Referring, now, to the means for shaping the shells tapering: On the slide $g$ are arranged two spindles 39 alined with the two dies first opposed by the shells, and on the slide $h$, set in holders 40 screwed into the slide so that they are longitudinally adjustable, are the spindles 41. The dies referred to are internally tapering (Fig. 18), and the first pair of spindles 39, on movement of slide $g$ to the left, are adapted to force the shells thereinto to constrict them into tapering form and the other pair 41 to clear the thus-formed shells from the dies and return them to the pockets in the turret on right hand movement of the slide $h$. The chamfered mouths of the holes 22 in plate 18 corresponding to the dies in question insure the entry of the shells to the dies without mutilation.

Now referring to the means for forming the mouth-portions of the shells into cylindrical form while leaving them otherwise tapering: On slide $g$ are arranged two spindles 42 alined with the two dies next opposed by the shells, and on the slide $h$, in holders 43 screwed into the slide so as to be longitudinally adjustable, are the spindles 44. Said dies are tapering except at their left-hand ends, where they are reduced and cylindrical. On movement of spindles 42 to the left, they force the waiting shells from the turret into the dies so as to constrict their mouth portions to cylindrical shape and on movement of slide $h$ to the right spindles 44 return the shells to their pockets in the turret. I have found in practice that merely tapering or chamfering the guiding-in ends of the holes 22 does not in the case of the holes 22 for the dies for mouth-reducing the shells properly serve the purpose, because the shells being now tapered can assume an unfavorable angle to insure their entry into the dies without injury. Hence the guiding-in holes 22 of plate 18 are in this instance expansible, being formed by the spring-constricted sectors 28, as already stated. Upon the shells being ejected from the dies in question and returned to the pockets in the turret the previous constricting of their mouth-portions to cylindrical form will cause them to grip the spindles 44 to such an extent that the dogs 3 would not of themselves, perhaps, clear them from the spindles when the latter again recede to the left (Fig. 19); hence I provide the herein-before mentioned dogs 12 which, being opposed to the dogs 3, are well adapted to co-act therewith to hold the shells in the pockets when spindles 44 recede.

Referring, now, to the means for ball-sizing the shells: the last pair of dies are permanently telescoped by spindles 45 which are stationarily supported in a holder 46 bolted to the table $b$, their free or telescoped ends being tapering. On slide $g$ are arranged two spindles 47 alined with said dies and on slide $h$, in holders 48 screwed into the slide 30 so as to be longitudinally adjustable, are two tubular spindles 49, telescoped by spindles 45. Said dies are plain-cylindrical. On movement of spindles 47 to the left, they force the shells into the dies and cause their mouths to be telescoped by the tapering ends of the spindles 45, which size them to the proper diameter to receive the balls or bullets. On movement of the spindles 49 to the right, said shells are cleared from the dies and returned to their pockets in the shell carrier.

It will be noted that the acting end of each of the spindles 39, 42 and 47 is chamfered or rounded. The object of this is to have the spindles act cam-fashion against the coresponding dogs 3 and 12 to retract the same clear of the cannelures of the shells preliminary to advancing them into the dies; when the corresponding opposite or ejecting spindles return the shells to the pockets the first-named spindles are clear of the dogs, so that the latter are free to reëngage and retain the shells in the pockets.

The barrel cams $e$ and $f$ are so shaped and related that on each rotation of shaft $d$ first slide $h$ and then slide $g$ moves to the left, and then both slides move to the right substantially together. With reference to the step-by-step movements of the turret, the movements of the slides are as follows: First slide $h$ moves to the left; then the turret turns and stops; then while the turret is at pause slide $g$ moves to the left and back, accompanied in its return stroke by slide $h$, and slide $h$ moves back to the left.

In view of the foregoing, the operation of the machine will be readily understood. The shells being fed into the turret two-by-two as described, eight are operated upon at progressive stages on each turn of the turret to a new position; i. e., two are subjected to the selecting operation, being re-formed, if necessary, unless they are ejected, two are tapered, two have their mouth portions made cylindrical, and two have their mouths ball-sized all at once. After each two have passed through the various stages of the operation thereon, they fall from their pockets in the turret into the delivery chute 50.

The tables $b$ and $c$ are preferably joined by the tie-rods 51 so that each assumes a part of the strain imposed on the other incident to the thrust of the spindle-carrying slides.

Having thus fully described my invention, what I claim as new and desire to secure by Letters Patent is:—

1. A mechanism for operating on elongated articles including a carrier rotative on a substantially horizontal axis and having pocket means, arranged in succession around its axis, to hold a series of the articles each substantially horizontally, means, with reference to which the carrier moves and including an elongated substantially horizontal die and a part thrustwise movable substantially parallel with said axis to move the articles against the die, for operating upon the articles in succession, and means to feed the articles each sidewise of itself into the successive holding means of the carrier.

2. A mechanism for operating on elongated articles including a carrier rotative on a substantially horizontal axis and having pocket means, arranged in succession around its axis, to hold a series of the articles each substantially horizontally, and means, with reference to which the carrier moves and including an elongated substantially horizontal die and a part thrustwise movable substantially parallel with said axis to move the articles against the die, for operating upon the articles in succession.

3. A mechanism for operating on elongated articles including a carrier rotative on a substantially horizontal axis and having pocket means, arranged in succession around said axis and being each open at the periphery of said carrier, to hold a series of the articles each substantially horizontally, means, with reference to which the carrier moves and including an elongated substantially horizontal die and a part thrustwise movable substantially parallel with said axis to move the articles against the die, for operating upon the articles in succcession, and article feeding means holding a line of the articles, each parallel with said axis, pressing toward the periphery of said carrier.

4. A mechanism for operating on elongated articles including a carrier rotative on a substantially horizontal axis and having pocket means, arranged in succession around said axis and being each open at the periphery of said carrier, to hold a series of the articles each substantially horizontally, means, with reference to which the carrier moves and including an elongated substantially horizontal die and a part thrustwise movable substantially parallel with said axis to move the articles against the die, for operating upon the articles in succession, article feeding means holding a line of the articles, each parallel with said axis, pressing toward the periphery of said carrier, and means, opposite the periphery of said carrier, to confine the articles in the pocket means.

5. A mechanism for operating on elongated articles including a moving carrier having means, arranged in a line longitudinal of the carrier's path of movement, to hold a series of the articles each transverse of said path and horizontally, each such means being open transversely of the article held thereby, and means, past which the carrier moves and including an elongated substantially horizontal die and a part thrustwise movable longitudinally of the articles in the carrier to move the articles against the die, for operating on said articles.

6. A mechanism for operating on elongated articles including a moving carrier having means, arranged in a line longitudinal of the carrier's path of movement, to hold a series of the articles each transverse of said path and horizontally, each such means being open transversely of the article held thereby, means, with reference to which the carrier moves and including an elongated substantially horizontal die and a part thrustwise movable longitudinally of the articles in the carrier to move the articles against the die, for operating on said articles, and means to feed the articles each sidewise of itself into the successive holding means of the carrier.

7. A mechanism for operating on elongated articles including means to feed the articles in a line each downwardly and sidewise of itself, a carrier movable across the line of feeding the articles and crosswise of the articles as fed and having means, arranged in a line longitudinal of the path of movement of the carrier, to hold a series of the articles each crosswise of said path and horizontally, each such holding means being open toward the feeding means, and means, with reference to which the carrier moves and including an elongated substantially horizontal die and a part thrustwise movable longitudinally of the articles in the carrier to move the articles against the die, for operating on the articles.

8. In combination, a device to operate on cannelured articles fixed with reference to a definite plane, mechanism for conveying the articles substantially parallel with said plane including a carrier having yielding means engageable in the cannelures thereof to hold the articles each a definite distance from said plane while advancing, and means to force the articles out of the control of the first means and against said device.

9. In combination, a device to operate on cannelured articles fixed with reference to a definite plane, mechanism for conveying the articles substantially parallel with said plane including a carrier having yielding means engageable in the cannelures thereof to hold the articles each a definite distance from said plane while advancing, and means to force the articles out of the control of the first means and against said device and then back into the control of said first means.

10. In combination, means to advance the articles including a carrier movable in a definite path and having pockets extending transversely of said path, means to feed the articles to said pockets, means to operate on the articles being advanced, and means to cam the articles longitudinally into and thereupon hold them in trued up relation on deposit thereof in the pockets.

11. In combination, a pocketed structure having its pocket open at both ends and adapted to receive the article, means opposite one end of said pocket to operate on the article, a spindle to enter the other end of said pocket and force the article against said means, and spindle-retracted means normally holding the articles aganst movement longitudinally of said pocket.

12. In a machine for operating on substantially tubular articles, a carrier having holders for the articles extending transversely, and arranged in a series extending longitudinally, of the path of advance of the carrier, each article being ejectable from its holder at one end thereof, a selecting spindle enterable into each article and arranged on the side of the carrier corresponding to the other ends of the holders, means to cause the spindle to perform thrust movements into the article-spaces of the holders, and means to oppose resistance to the ejection of the articles from said holders yieldable away from the spindle.

13. In combination, a device to hold a substantially tubular article, a spindle device axially alined with and enterable into the article to be operated upon, means to move one of said devices toward the other, the article being ejectable longitudinally from the first device, and means to oppose resistance to the ejection of the article yieldable away from the spindle.

14. In combination, a device to hold a substantially tubular article, a spindle device axially alined with and enterable into the article to be operated upon, means to move the spindle device toward the other device, the article being ejectable longitudinally from the first device, and a resistance device opposing ejection of the article and having a longitudinal sliding connection with the spindle device, said sliding connection being limited in the direction of thrust of the spindle device.

15. In combination, a supporting structure, a line of devices to operate on the articles, opposed spaced means, arranged on opposite sides of said line of devices and movable back and forth on the supporting structure each toward and from the said line of devices, for forcing the articles against and thereupon withdrawing them from said line of devices, means to convey the articles to be operated upon between said line of devices and one of the first-named means, and a rotary actuating structure, journaled parallel with the path of movement of the first-named means, for moving the latter back and forth.

16. In combination, a supporting structure, two series of pairs of spaced spindles, the spindles of each pair being substantially alined with each other, a line of devices to operate on the articles arranged between the two series of spindles, two slides respectively carrying the two series of spindles and movable on said structure longitudinally thereof, means to convey the articles in a line between and parallel with the line of devices and one series of spindles, and a rotary actuating structure, journaled parallel with the spindles, for moving the slides back and forth and thereby causing the spindles to force the articles against and thereupon withdraw them from said devices.

17. In combination, a supporting structure, a line of dies arranged thereon, sliding means movable on said structure toward and from the dies to move the articles with reference to the dies, rotary means to convey the articles between said line of dies and the sliding means, said rotary means having its axis parallel with the path of travel of the sliding means, and means, including an actuating structure rotating on an axis parallel with said path, for rotating the rotary means and moving the sliding means back and forth.

In testimony whereof I affix my signature.

AMOS CALLESON.